US 9,527,358 B2

(12) United States Patent
Leonard (10) Patent No.: US 9,527,358 B2
(45) Date of Patent: Dec. 27, 2016

(54) GAS SPRING END MEMBERS AS WELL AS GAS SPRING ASSEMBLIES INCLUDING SAME

(71) Applicant: Firestone Industrial Products Company, LLC, Indianapolis, IN (US)

(72) Inventor: Joshua R. Leonard, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/707,286

(22) Filed: May 8, 2015

(65) Prior Publication Data
US 2015/0321530 A1 Nov. 12, 2015

Related U.S. Application Data

(60) Provisional application No. 61/990,881, filed on May 9, 2014.

(51) Int. Cl.
*F16F 9/04* (2006.01)
*B60G 11/27* (2006.01)
(Continued)

(52) U.S. Cl.
CPC ............... *B60G 11/27* (2013.01); *B60G 11/28* (2013.01); *B60G 11/30* (2013.01); *B60G 15/12* (2013.01);
(Continued)

(58) Field of Classification Search
CPC ............ F16F 9/04; F16F 9/0454; F16F 9/049; F16F 9/05; F16F 9/057; B60G 11/27; B60G 11/28; B60G 2202/152; B60G 2500/201
(Continued)

(56) References Cited

U.S. PATENT DOCUMENTS 2,917,319 A   12/1959  Axtmann
3,038,716 A    6/1962  Brown
(Continued)

FOREIGN PATENT DOCUMENTS

DE   1048165         12/1958
DE   4018712 A1  *  12/1991  ....... B60G 17/01933
(Continued)

OTHER PUBLICATIONS

International Search Report and Written Opinion for corresponding International Patent Application No. PCT/US2015/029860 dated Jul. 8, 2015.

*Primary Examiner* — Thomas J Williams
(74) *Attorney, Agent, or Firm* — Thomas R. Kingsbury; Fay Sharpe LLP (57) ABSTRACT

A gas spring end member has an end member axis and is dimensioned for securement to an associated flexible spring member. The gas spring end member includes an end member wall with a base wall portion disposed transverse to the end member axis. An outer wall portion extends axially from along the base wall portion. A mounting wall portion is dimensioned to receivingly engage an associated end of the associated flexible spring member. An end wall portion extends peripherally about the end member axis and operatively connects the outer wall portion and the mounting wall portion to at least partially define an end member volume. An inner wall portion separates the end member volume into an end member reservoir disposed outward of the inner wall portion and an end member chamber disposed inward of the inner wall portion. Gas spring assemblies and suspensions systems are also included.

20 Claims, 7 Drawing Sheets

(51) Int. Cl.
    *B60G 15/12*     (2006.01)
    *B60G 11/28*     (2006.01)
    *B60G 11/30*     (2006.01)
    *F16F 9/05*     (2006.01)

(52) U.S. Cl.
    CPC ............ *F16F 9/04* (2013.01); *F16F 9/049* (2013.01); *F16F 9/05* (2013.01); *B60G 2202/152* (2013.01); *B60G 2202/154* (2013.01); *B60G 2206/42* (2013.01); *B60G 2500/201* (2013.01)

(58) Field of Classification Search
    USPC ........ 267/64.27, 122; 248/631; 280/124.157, 280/124.16, 124.161
    See application file for complete search history.

(56) References Cited

U.S. PATENT DOCUMENTS

| | | | | |
|---|---|---|---|---|
| 4,993,694 A | * | 2/1991 | Gandiglio | ............... F16F 9/084 267/122 |
| 8,585,025 B2 | * | 11/2013 | Lee | ............ B60G 11/27 267/64.15 |

FOREIGN PATENT DOCUMENTS

| | | | | |
|---|---|---|---|---|
| FR | 1304020 A | * | 9/1962 | ......... B60G 17/0485 |
| FR | 2663100 | | 12/1991 | |
| WO | WO00/75527 | | 12/2000 | |
| WO | WO2012/087917 | | 6/2012 | |

\* cited by examiner

GAS SPRING END MEMBERS AS WELL AS GAS SPRING ASSEMBLIES INCLUDING SAME

This application claims priority from U.S. Provisional Patent Application No. 61/990,881, filed on May 9, 2014, the contents of which is hereby incorporated herein by reference in its entirety.

BACKGROUND

The subject matter of the present disclosure broadly relates to the art of gas spring devices and, more particularly, to gas spring end members that include an end member reservoir and an end member chamber dimensioned to receive at least a portion of an opposing end member. Gas spring assemblies including one or more of such end members as well as suspension systems including one or more of such gas spring assemblies are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Generally, the plurality of spring elements function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

In many applications involving vehicle suspension systems, it may be desirable to utilize spring elements that have as low of a spring rate as is practical, as the use of lower spring rate elements can provide improved ride quality and comfort compared to spring elements having higher spring rates. That is, it is well understood in the art that the use of spring elements having higher spring rates (i.e., stiffer springs) will transmit a greater magnitude of road inputs into the sprung mass of the vehicle and that this typically results in a rougher, less-comfortable ride. Whereas, the use of spring elements having lower spring rates (i.e., softer, more-compliant springs) will transmit a lesser amount of road inputs into the sprung mass and will, thus, provide a more comfortable ride.

In some cases, the spring devices of vehicle suspension systems will include springs that utilize pressurized gas as the working medium of the devices. Generally, it is possible to reduce the spring rate of gas springs, thereby improving ride comfort, by increasing the volume of pressurized gas operatively associated with the gas spring. This is commonly done by placing an additional chamber, cavity or volume filled with pressurized gas into fluid communication with the primary spring chamber of the gas spring. However, such constructions can undesirably result in an increased overall size and/or shape of the gas spring assembly.

Additionally, in some cases, the one or more damping elements can be of a type and kind that utilize gaseous fluid rather than liquid as the working medium. In known constructions, the pressurized gas damping element can permit gas flow between two or more volumes of pressurized gas, such as through one or more orifices or through one or more valve ports. Generally, there is some resistance to the movement of pressurized gas through these passages or ports. This resistance acts to dissipate energy associated with gas springs and/or suspension systems, and thereby provide some measure of damping.

Notwithstanding the overall success of known constructions, certain disadvantages may still exist that could be limiting to broader adoption and/or use of gas spring devices. Accordingly, it is believed desirable to develop gas spring devices that overcome the foregoing and/or other problems and/or disadvantages of known designs, and/or otherwise advance the art of gas spring devices.

BRIEF DESCRIPTION

One example of a gas spring assembly in accordance with the subject matter of the present disclosure can include a flexible spring member having a longitudinal axis. The flexible spring member can include a flexible wall extending longitudinally between first and second ends and peripherally about the axis to at least partially define a spring chamber. A first end member can be secured across the first end of the flexible spring member such that a substantially fluid-tight seal is formed therebetween. A second end member can be disposed in spaced relation to the first end member and can be secured across the second end of the flexible spring member such that a substantially fluid-tight seal is formed therebetween. The second end member can include an end member wall. The end member wall can include a base wall portion disposed transverse to the longitudinal axis. The end member wall can also include an outer wall portion that can extend axially from along the base wall portion in a first direction toward the first end member. The outer wall portion can extend peripherally about the longitudinal axis and can at least partially define an outermost periphery of the second end member. The end member wall can further include a mounting wall portion disposed in axially spaced relation to the base wall portion in the first direction. The mounting wall portion can extend peripherally around the longitudinal axis and can be spaced inward from the outer wall portion. The mounting wall portion can be dimensioned to receivingly engage the second end of the flexible spring member. The end member wall can also include an end wall portion that can extend peripherally about the longitudinal axis and can operatively connect the outer wall portion and the mounting wall portion to at least partially define an end member volume within the second end member. And, the end member wall can include an inner wall portion that can extend peripherally about the longitudinal axis and can extend from along the base wall portion in the first direction toward the mounting wall portion. The inner wall portion can separate the end member volume into an end member reservoir that can be disposed outward of the inner wall portion and an end member chamber that can be substantially contiguous with the spring chamber. The gas spring assembly can be displaceable during use between an extended condition and a compressed condition. The inner wall portion can be dimensioned such that at least a portion of the first end member can be coextensively received within the end member chamber in the compressed condition.

One example of a suspension system in accordance with the subject matter of the present disclosure can include a pressurized gas system that includes a pressurized gas source and a control device. The suspension system can also include at least one gas spring assembly according to the foregoing paragraph. The at least one gas spring assembly can be disposed in fluid communication with the pressurized gas source through the control device such that pressurized gas can be selectively transferred into and out of the spring chamber.

One example of a gas spring end member in accordance with the subject matter of the present disclosure can have an end member axis and can be dimensioned for securement to an associated flexible spring member. The gas spring end member can include an end member wall that is at least partially formed from one of a metal material and a polymeric material. The end member wall can include a base wall portion disposed transverse to the end member axis. An outer wall portion can extend axially from along the base wall portion in a first direction away from the base wall portion. The outer wall portion can extend peripherally about the end member axis and can at least partially define an outermost periphery of the gas spring end member. A mounting wall portion can be disposed in axially spaced relation to the base wall portion in the first direction. The mounting wall portion can extend peripherally around the end member axis and can be spaced inward from the outer wall portion. The mounting wall portion can be dimensioned to receivingly engage an associated end of the associated flexible spring member. An end wall portion can extend peripherally about the end member axis and can operatively connect the outer wall portion and the mounting wall portion to at least partially define an end member volume within the gas spring end member. An inner wall portion can extend peripherally about the end member axis and can extend from along the base wall portion in the first direction toward the mounting wall portion. The inner wall portion can separate the end member volume into an end member reservoir disposed outward of the inner wall portion and an end member chamber disposed inward of the inner wall portion.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and ease of understanding.

Figure 1:
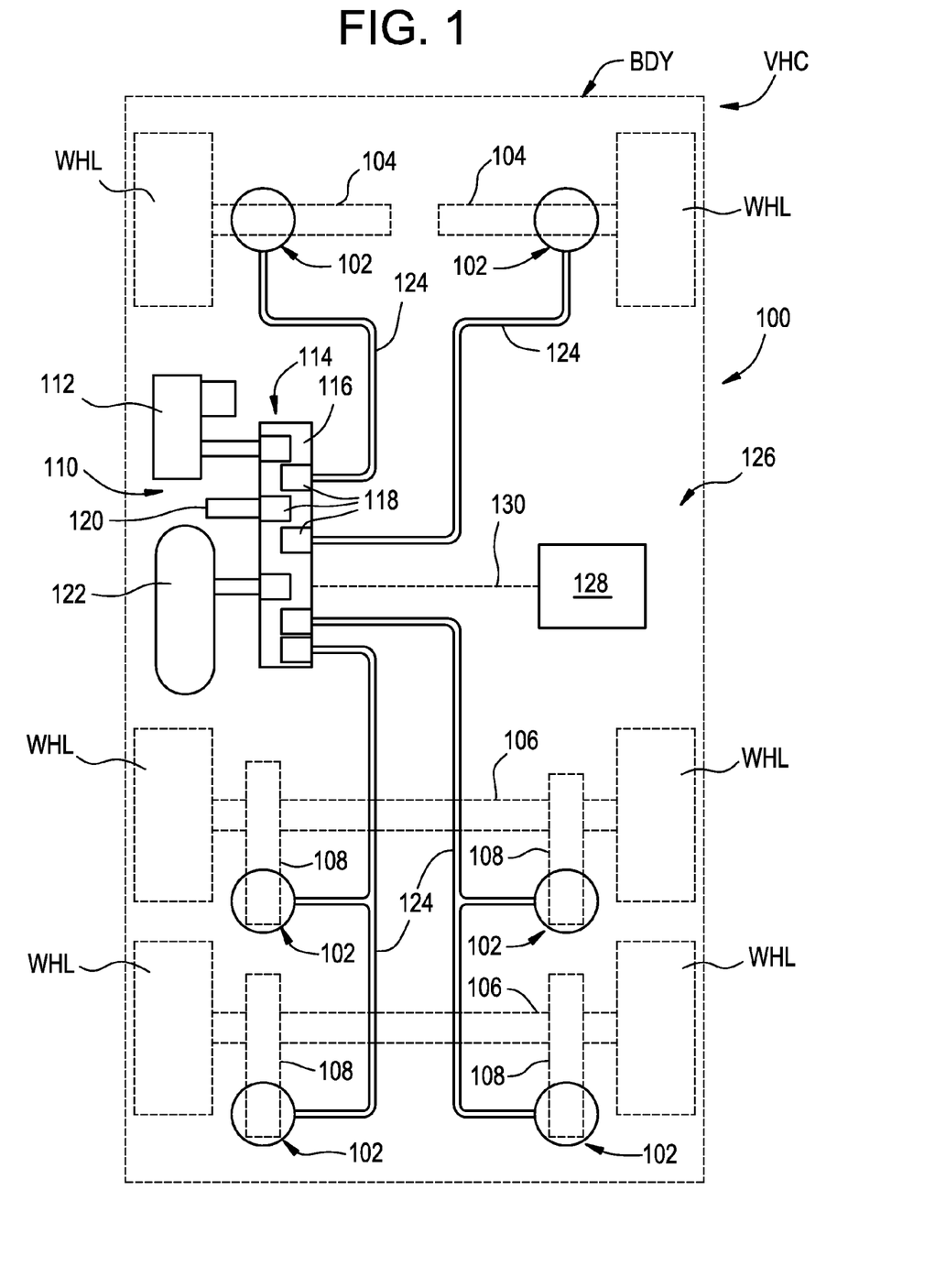
FIG. 1 is a schematic representation of one example of a suspension system of an associated vehicle that includes one or more gas spring assemblies in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated wheel-engaging member or axle, for example, of an associated vehicle VHC. It will be appreciated that any such suspension systems can include any number of one or more systems, components and/or devices, and that the same can be operatively connected between the sprung and unsprung masses of the associated vehicle in any suitable manner. For example, such suspension systems can include a plurality of damping members (not shown), which can be operatively connected between the sprung and unsprung masses of the associated vehicle in any suitable manner.

Additionally, such suspension systems can include a plurality of gas spring assemblies that are supported between the sprung and unsprung masses of associated vehicle VHC. In the construction shown in FIG. 1, suspension system 100 includes six gas spring assemblies, one or more of which is disposed toward each corner of the associated vehicle adjacent a corresponding wheel WHL thereof. It will be appreciated, however, that any other suitable number of gas spring assemblies could alternately be used and/or that such gas spring assemblies can be disposed in any other suitable configuration and/or arrangement. In the exemplary arrangement schematically represented in FIG. 1, a plurality of gas spring assemblies 102 are operatively connected between the sprung and unsprung masses of the vehicle with two of gas spring assemblies 102 operatively associated with front wheel-engaging members 104 of vehicle VHC and the remaining gas spring assemblies operatively associated with rear wheel-engaging members 106 of vehicle VHC. In particular, rear wheel-engaging members 106 are shown as including trailing arms 108 that are operatively connected to the rear wheel-engaging members with gas spring assemblies 102 operatively disposed between a trailing arm and the sprung mass (e.g., body BDY) of the vehicle. It will be appreciated, however, that other suitable arrangements and/or configurations could alternately be used.

Suspension system 100 can also optionally include a pressurized gas system 110 that is operatively associated with the gas spring assemblies for selectively supplying pressurized gas (e.g., air) thereto and selectively transferring pressurized gas therefrom. In the exemplary embodiment shown in FIG. 1, pressurized gas system 110 includes a pressurized gas source, such as a compressor 112, for example, for generating pressurized air or other gases. The pressurized gas system can also include any number of one or more control devices of any suitable type, kind and/or construction that may be capable of permitting and/or preventing the selective transfer of pressurized gas. For example, a valve assembly 114 is shown as being in communication with compressor 112 and can be of any suitable configuration or arrangement. In the exemplary embodiment shown, valve assembly 114 includes a valve block 116 with a plurality of valves 118 supported thereon. Valve assembly 114 can also optionally include a suitable exhaust, such as a muffler 120, for example, for venting pressurized gas from the system. Optionally, pressurized gas system 110 can also include a reservoir 122 in fluid communication with valve assembly 114 and suitable for storing pressurized gas for an extended period of time, such as hours, days, weeks or months, for example.

The one or more control devices, such as valve assembly 114, for example, can be in communication with gas spring assemblies 102 in any suitable manner, such as, for example, through suitable gas transmission lines 124. As such, pressurized gas can be selectively transferred to and/or from the gas springs through valve assembly 114, such as to alter or maintain vehicle height at one or more corners of the vehicle, for example.

Suspension system 100 also includes a control system 126 that is capable of communication with any one or more other systems and/or components (not shown) of suspension system 100 and/or of vehicle VHC, and is capable of selective operation and control of the suspension system. Control system 126 includes a controller or electronic control unit (ECU) 128 in communication with compressor 112 and/or valve assembly 114, such as through a suitable conductor or lead 130, for example, for selective operation and control thereof, including supplying and exhausting pressurized gas to and from any number of one or more gas spring assemblies, such as gas spring assemblies 102, for example. Additionally, it will be appreciated that controller 128 can be of any suitable type, kind and/or configuration.

Control system 126 can also optionally include one or more height or distance sensing devices (not shown) as well as any other desired systems and/or components. Such height sensors, if provided, are preferably capable of generating or otherwise outputting a signal having a relation to a height or distance, such as between spaced components of the vehicle, for example. It will be appreciated that any such optional height sensors or any other distance-determining devices, if provided, can be of any suitable type, kind, construction and/or configuration, such as mechanical linkage sensors, ultrasonic wave sensors or electromagnetic wave sensors, such as may operate using ultrasonic or electromagnetic waves, for example.

Having described an example of a suspension system (e.g., suspension system 100) that can include one or more gas spring assemblies in accordance with the subject matter of the present disclosure, one example of such a gas spring assembly will now be described in connection with FIGS. 2-7. As shown therein, a gas spring assembly 200, such as may be suitable for use as one of gas spring assemblies 102 in FIG. 1, for example, can have a longitudinally-extending axis AX and can include one or more end members, such as an end member (or end member assembly) 202 and an end member (or end member assembly) 204 that is spaced longitudinally from end member 202. A flexible spring member 206 can extend peripherally around axis AX and can be secured between the end members in a substantially fluid-tight manner such that a spring chamber 208 is at least partially defined therebetween.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. In the arrangement shown in FIG. 2, for example, end member 202 can be secured along a first or upper structural component USC, such as associated vehicle body BDY in FIG. 1, for example, and can be secured thereon in any suitable manner. Additionally, in the arrangement shown in FIG. 2, for example, end member 204 can be secured on or along a second or lower structural component LSC, such as one of associated trailing arms 108 in FIG. 1, for example.

Figure 2:
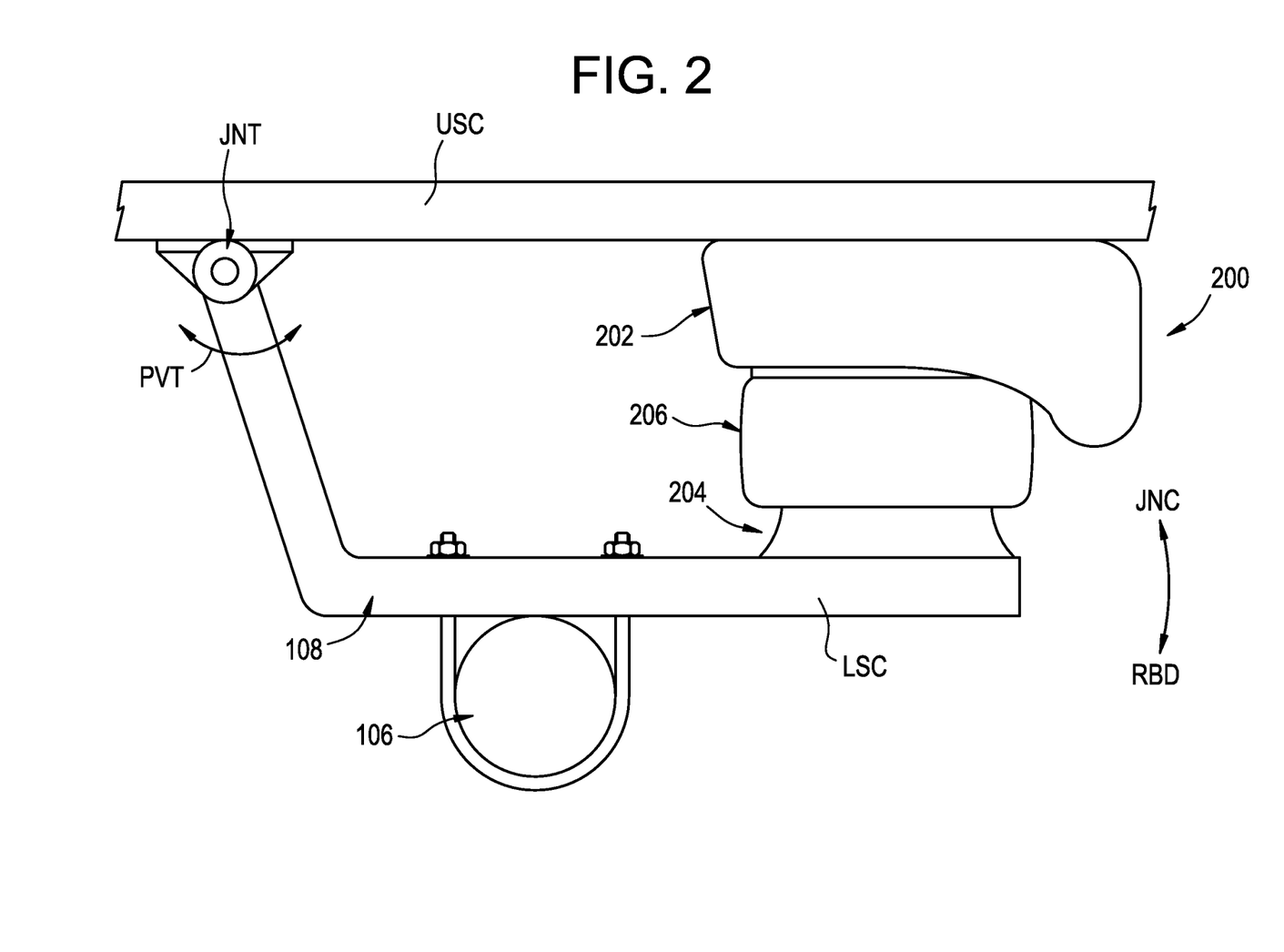
FIG. 2 is a side view of a portion of the suspension system in FIG. 1 illustrating one example of a gas spring assembly in accordance with the subject matter of the present disclosure in an installed condition between structural components of a vehicle.

In the arrangement shown in FIG. 2, lower structural component LSC is pivotally attached to upper structural component USC such that the structural components can move relative to one another about joint JNT, as is represented by arrow PVT, for example. During use, lower structural component LSC is displaced between jounce (or compressed) conditions and rebound (or extended) conditions, as is well understood by those of skill in the art. As shown in FIG. 2, movement toward a jounce condition is identified by arrow JNC and movement toward a rebound condition is identified by arrow RBD. As the associated structural components are displaced relative to one another in a jounce direction, it will be recognized and appreciated that gas spring assembly 200 is compressed. Conversely, as the associated structural components are displaced relative to one another in a rebound direction the gas spring assembly in FIG. 2 is extended.

It will be appreciated, that the movement of the associated structural components relative to one another, as described above, can be due to variations in load conditions and/or result from road inputs and/or other impact conditions (e.g., jounce conditions), as is well understood by those of skill in the art. Additionally, it will be recognized and appreciated that gas spring assembly 200 and/or components thereof will typically move relative to one another through a curvilinear, rotational, arcuate, angular or other non-linear manner.

End members 202 and 204 can be secured on or along a corresponding one of upper and lower structural components USC and LSC in any suitable manner. For example, one or more securement features can be included along end member 202. In some cases, the one or more securement features can project outwardly from the end member and can be secured on or along the structural component in a suitable manner, such as, for example, by way of one or more threaded nuts. In other cases, one or more securement features, such as threaded passages 210, for example, can extend into end member 202. In such cases, threaded passages 210, which can be blind passages and/or through passages, can be dimensioned to receive a corresponding securement device, such as threaded fasteners 212, for example, which can extend through one or more holes (not shown) in the structural component and into engagement with one of threaded passages 210.

As another example, one or more securement features can be included along end member 204. In some cases, the one or more securement features can project outwardly from the end member and can be secured on or along the structural component in a suitable manner, such as, for example, by way of one or more threaded nuts. In other cases, one or more securement features, such as threaded passage 214, for example, can extend into end member 204. In such case, threaded passage 214, which can be blind passages and/or through passages, can be dimensioned to receive a corresponding securement device, such as threaded fastener 216, for example, which can extend through one or more holes (not shown) in the structural component and into engagement with threaded passage 214.

Additionally, a fluid communication port, such as a transfer passage 218 (FIG. 4), for example, can optionally be provided to permit fluid communication with spring chamber 208, such as may be used for transferring pressurized gas into and/or out of the spring chamber, for example. In the exemplary embodiment shown, transfer passage 218 extends into end member 202 through a wall or wall portion thereof and is in fluid communication with spring chamber 208. It will be appreciated, however, that any other suitable fluid communication arrangement could alternately be used.

Flexible spring member 206 can be of any suitable size, shape, construction and/or configuration. Additionally, the flexible spring member can be of any type and/or kind. Flexible spring member 206 is shown in FIGS. 2-7 as being of an elongated sleeve-like design and can include a flexible wall 220 that can be formed in any suitable manner and from any suitable material or combination of materials, such as by using one or more fabric-reinforced, elastomeric plies or layers and/or one or more un-reinforced, elastomeric plies or layers, for example. Typically, two or more fabric-reinforced, elastomeric plies and two or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 220 can extend in a generally longitudinal direction between opposing ends 222 and 224. Additionally, flexible wall 220 can include an outer surface 226 and an inner surface 228, the latter of which can at least partially define spring chamber 208. In some cases, flexible wall 220 can be constructed from a plurality of layers or plies, such as an outer or cover ply that at least partially forms outer surface 226 and an inner or liner ply that at least partially forms inner surface 228. In some cases, flexible wall 220 can further include one or more reinforcing plies disposed between the outer and inner surfaces. It will be appreciated that any such reinforcing plies, if included, can be of any suitable construction, configuration and/or arrangement. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle.

Additionally, it will be appreciated that flexible spring member 206 can be operatively connected between end members 202 and 204 in any suitable manner and that any suitable combination of features and/or components can be included on or along end member 202, end member 204 and/or flexible spring member 206. As one example, flexible spring member 206 can, optionally, include a mounting bead disposed along either one or both of ends 222 and 224 of flexible wall 220. As identified in FIGS. 5 and 6, for example, mounting beads 230 and 232 are shown as being respectively disposed along ends 222 and 224. In some cases, the mounting beads can, optionally, include a reinforcing element, such as an endless, annular bead wire 234, for example.

It will be appreciated that the one or more end members can be of any suitable type, kind, construction and/or configuration. Additionally, it will be appreciated that the one or more end members can be formed from any suitable number of one or more elements and/or components. Furthermore, it will be appreciated that the one or more end members can include any suitable number of one or more walls and/or wall portions, and that the one or more end members can be operatively connected or otherwise secured to the flexible spring member in any suitable manner.

In the exemplary arrangement shown in FIGS. 2-7, for example, end member 204 is shown as being of a type commonly referred to as a piston (or a roll-off piston) that has an outer surface 236 that abuttingly engages outer surface 226 of flexible spring member 206 such that a rolling lobe 238 is formed therealong. As gas spring assembly 200 is displaced between extended and collapsed conditions, rolling lobe 238 is displaced along outer surface 236 in a conventional manner.

Figure 5:
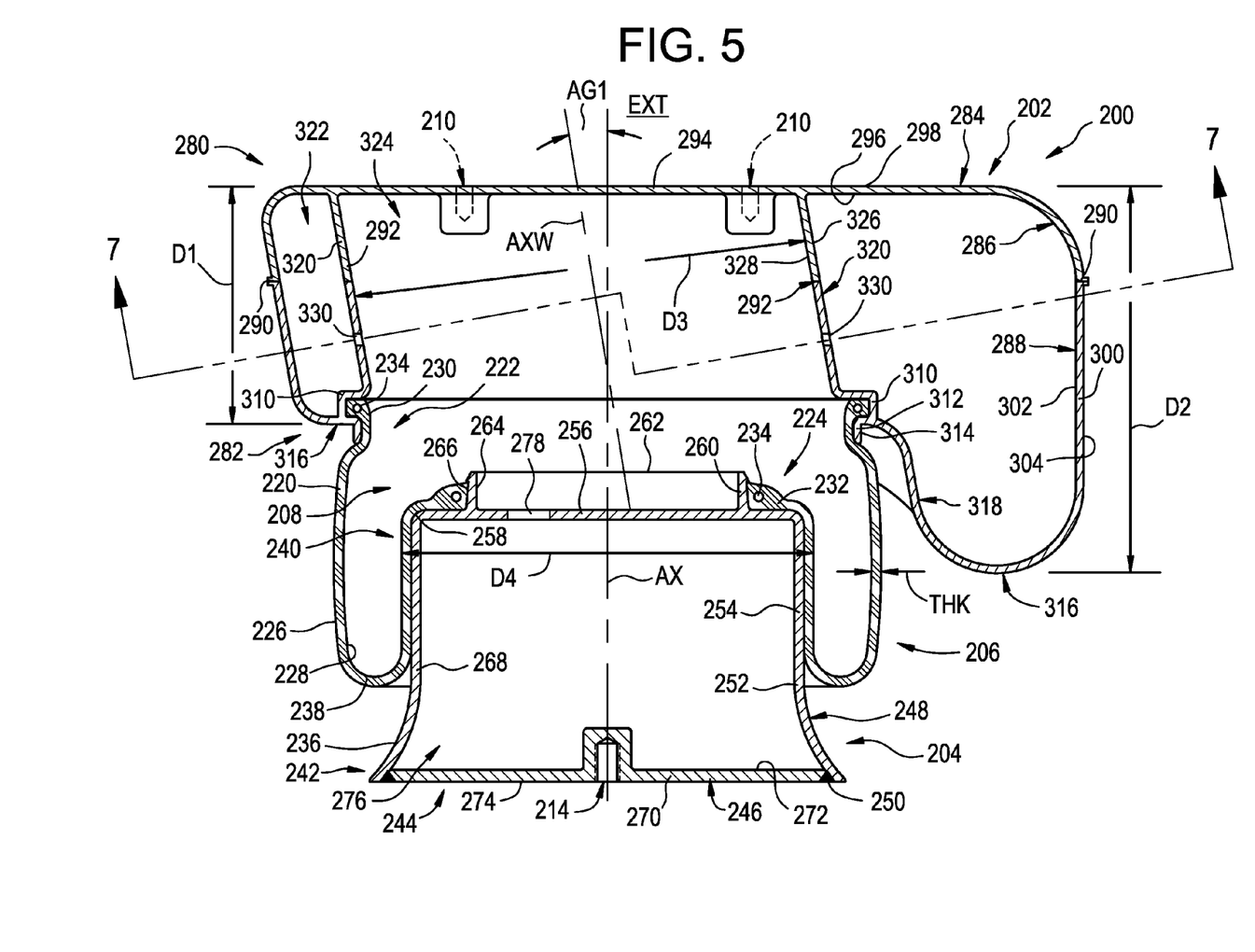
FIG. 5 is a cross-sectional side view of the gas spring assembly in FIGS. 2-4 taken from along line 5-5 in FIG. 4 and shown in a first condition of use.
Figure 6:
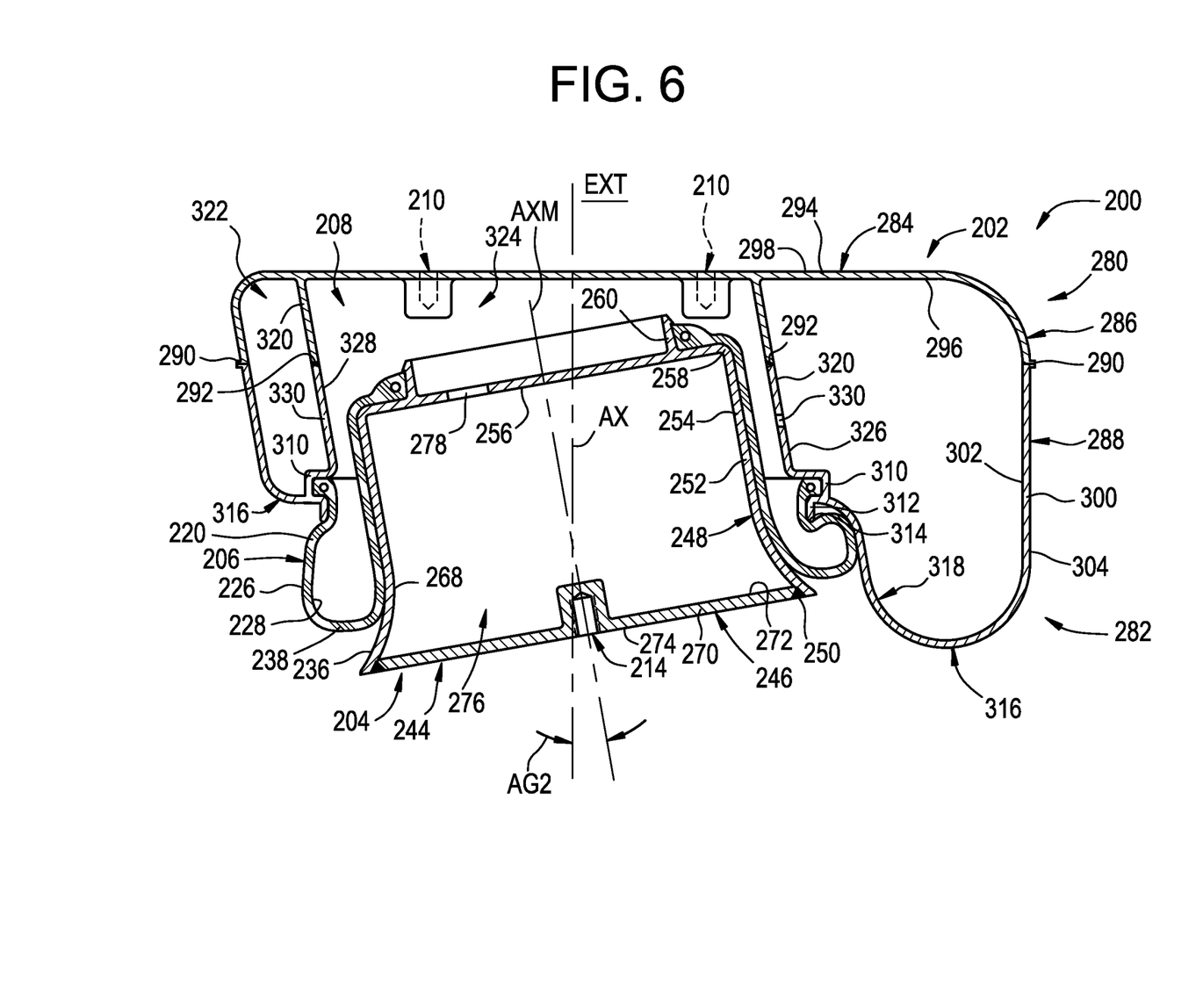
FIG. 6 is a cross-sectional side view of the gas spring assembly in FIGS. 2-5 shown in a second condition of use.

As identified in FIGS. 5 and 6, end member 204 extends generally between a first or upper end 240 and a second or lower end 242. As mentioned above, it will be appreciated that end member 204 can be formed from any combination of one or more elements and/or components. End member 204 can include an end member body 244 that is formed from a base member 246 and an outer shell 248, which is operatively connected to the base member such that a substantially fluid-tight seal is formed therebetween, such as through the use of a flowed-material joint 250 extending peripherally about axis AX, for example. It will be appreciated, however, that in other cases, an end member body could be used in which the base member and outer shell are integrally formed with one another. In such case, the base member could be alternately referred to as a base portion or base member portion, and the outer shell could be alternately referred to as an outer shell portion.

Outer shell (or outer shell portion) 248 can include a shell wall 252 that extends peripherally about axis AX. Shell wall 252 can include an outer side wall portion 254 that extends in a generally longitudinal direction between ends 240 and 242. Shell wall 252 also includes an end wall portion 256 that transitions into outer side wall portion 254 at a curved or shoulder portion 258. An inner side wall portion 260 can project from end wall portion 256 in a direction extending axially away from end 242. Inner side wall portion 260 can terminate in the axial direction at an end 262. Additionally, inner side wall portion 260 can include an outer surface (not numbered) facing radially outward and an inner surface 264 facing radially inward. One or more projections 266 can optionally extend radially outward from along the outer surface adjacent end 262 of inner side wall portion 260. In some cases, a substantially continuous, annular projection can be used. It will be recognized that a wide variety of shapes, profiles and/or configurations can and have been used in forming the outer side wall of piston-type end members for gas spring assemblies. As such, it will be appreciated that outer side wall portion 254 of shell wall 252 can be of any suitable shape, profile and/or configuration and that the profile shown in FIGS. 2 and 4-6 is merely exemplary.

In an assembled condition, mounting bead 232 of flexible spring member 206 can be received on or along the outer surface of inner side wall portion 260 such that a substantially fluid-tight seal is formed therebetween. If provided, projection 266 can assist in at least partially retaining mounting bead 232 on or along inner side wall portion 260. Additionally, outer side wall portion 254 of shell wall 252 can include an inside surface 268 as well as outside surface 236. As such, a portion of flexible spring member 206 can extend along end wall portion 256 and outside surface 236 of outer side wall portion 254 such that rolling lobe 238 is formed along end member body 244 and is displaced along the outer side wall portion as the gas spring assembly undergoes changes in overall height.

Base member 246 includes a base member wall 270 that can include an inside surface 272 and an outside surface 274, which can be disposed in abutting engagement with lower structural component LSC. Inside surface 272 of base member 246 and inside surface 268 of outer side wall portion 254 can at least partially define an end member chamber 276 within end member 204, which can be in fluid communication with spring chamber 208 or an external atmosphere EXT. In some cases, one or more openings, passages and/or conduits can extend through one or more portions of shell wall 252 such that end member chamber 276 can be disposed in fluid communication with spring chamber 208. It will be appreciated that openings, passages and/or conduits of any suitable size, shape and/or quantity can be used. As one example, an opening 278 extends through end wall portion 256 of shell wall 252 through which end member chamber 276 can be in fluid communication with spring chamber 208. In some cases, opening 278 can be of sufficient size to permit end member chamber 278 and spring chamber 208 to operate as a substantially unified fluid chamber. That is, opening 278 can be sufficiently large that minimal fluid flow restriction (e.g., approximate zero fluid flow restriction) will occur for pressurized gas flowing between spring chamber 208 and end member chamber 276 under typical conditions of operation. In other cases, opening 278 can at least partially form a passage, orifice or conduit of sufficient size and/or length to provide pressurized gas damping due to gas flow through the opening and thereby dissipate kinetic energy acting on gas spring assembly 200.

Figure 3:
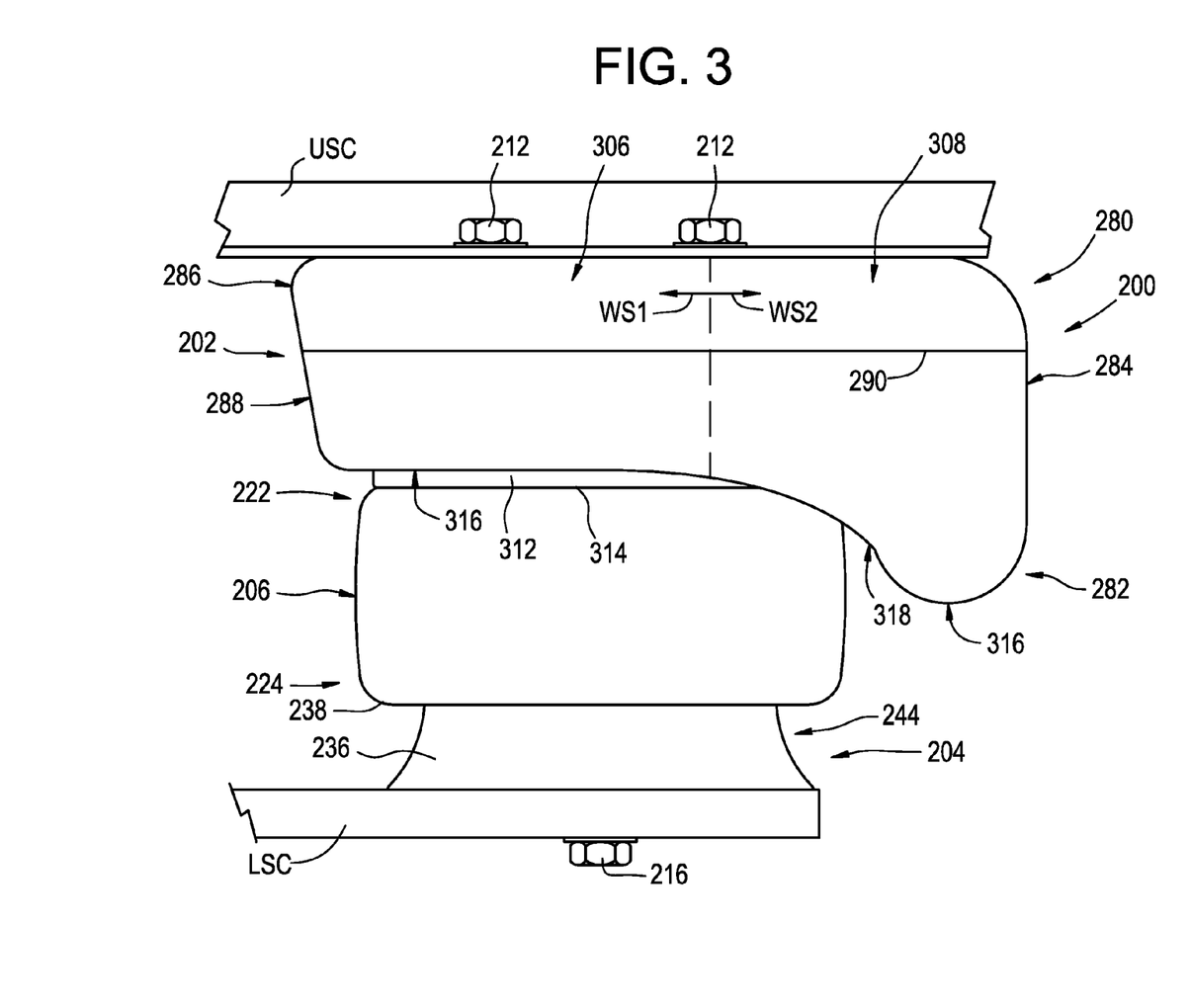
FIG. 3 is a side view of the exemplary gas spring assembly in FIG. 2.

As identified in FIGS. 3, 5 and 6, end member 202 extends generally between a first or upper end 280 and a second or lower end 282. As mentioned above, it will be appreciated that end member 202 can be formed from any combination of one or more elements and/or components. As one example, end member 202 can include an end member body 284 that is formed from a first or upper shell 286 and a second or lower shell 288. First and second shells 286 and 288 are shown in FIGS. 5 and 6 as being operatively connected to one another such that a substantially fluid-tight seal is formed therebetween. It will be appreciated that the first and second shells can be attached or otherwise operatively connected to one another in any suitable manner. As one example, flowed-material joints 290 and 292 can be formed between abutting edges of the first and second shells. In such case, joints 290 and 292 can extend peripherally about axis AX, for example, such that substantially fluid-tight seals are formed between adjacent features of first and second shells 286 and 288. It will be appreciated, however, that in other cases, an end member body could be formed from two or more shells having different configurations and/or arrangements. As such, it will be appreciated that the walls, wall portions and joint locations of end member body 284 are merely exemplary.

In an assembled condition, the end members can include any suitable number of one or more walls and/or wall portions. In the configuration shown in FIGS. 2-7, end member body 284 of end member 202 can include a base wall portion 294 that is disposed transverse to axis AX. Base wall portion 294 can include an inside surface 296 and an outside surface 298, the latter of which can include an approximately planar portion dimensioned for abutting engagement with a structural component (e.g., upper structural component USC). If provided, securement features, such as threaded passages 210, for example, can be accessible from along base wall portion 294.

Figure 4:
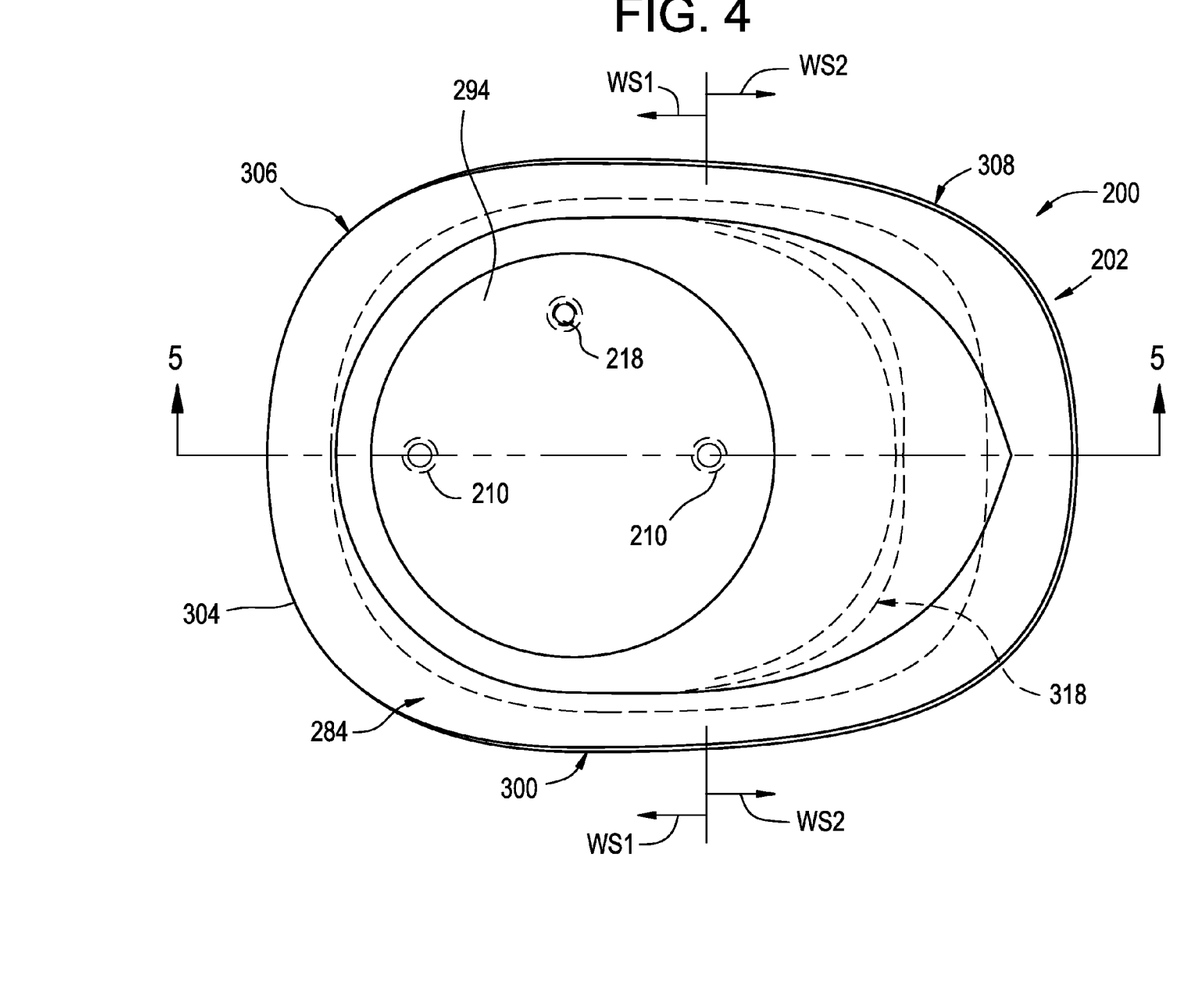
FIG. 4 is a top plan view of the gas spring assembly in FIGS. 2 and 3.

End member body 284 of end member 202 can also include an outer wall portion 300 that extends axially from along base wall portion 294 in a first direction toward end member 204. Outer wall portion 300 can extend peripherally about the longitudinal axis and can include an inner surface 302 and an outer surface 304, the latter of which can at least partially define an outermost periphery of end member 202. In some cases, outer wall portion 300 of end member body 284 can include two or more outer peripheral wall sections having different distal extents. For example, as identified in FIG. 4, outer wall portion 300 can include a first outer peripheral wall section 306 that extends circumferentially about axis AX in the area represented in FIG. 4 by arrows WS1. A second outer peripheral wall section 308 can extend circumferentially about axis AX in a direction generally opposite wall section 306, as is represented in FIG. 4 by arrows WS2. First outer peripheral wall section 306 is shown as extending axially from along base wall portion 294 to a first distal extent disposed at a first distance from the base wall portion, as is represented in FIG. 5 by reference dimension D1. Second outer peripheral wall section 308 is shown as extending axially from along base wall portion 294 to a second distal extent disposed at a second distance from the base wall portion, as is represented in FIG. 5 by reference dimension D2. It will be recognized from FIGS. 3, 5 and 6 that second distance D2 is greater than first distance D1.

End member body 284 can also include a mounting wall portion 310 that is disposed in axially spaced relation to base wall portion 294 in a direction toward end member 204. Mounting wall portion 310 can extend peripherally around axis AX and can be spaced inward from outer wall portion 300. In a preferred arrangement, mounting wall portion 310 can be dimensioned to receivingly engage a mounting bead or other feature disposed along end 222 of flexible spring member 206. In some cases, mounting wall portion 310 can include an annular groove (not numbered) having an open end facing radially inward and that is dimensioned to at least partially receive mounting bead 230 of flexible spring member 206 such that a substantially fluid-tight seal can be formed between end member 202 and flexible spring member 206. In some cases, mounting wall portion 310 can include an axially-extending projection 312 having a distal edge 314 disposed toward second end member 204. In an assembled condition, a portion of flexible wall 220 can abuttingly engage projection 312, such as is shown in FIGS. 5 and 6, for example.

End member body 284 can further include an end wall portion 316 that is disposed in axially-spaced relation to base wall portion 294 and extends peripherally about axis AX. End wall portion 310 can operatively connect outer wall portion 300 and mounting wall portion 310 to at least partially define an end member volume (not numbered) within end member 202. In cases in which outer wall portion 300 includes two or more outer peripheral wall sections having different distal extents, end wall portion 316 can have a non-planar peripheral profile as the end wall portion extends around axis AX.

Additionally, in some cases, mounting wall portion 310 can be disposed in approximate alignment with a distal extent of an outer peripheral wall section of the outer wall portion. In the arrangement shown in FIGS. 3, 5 and 6, mounting wall portion 310 is disposed in spaced relation from base wall portion 294 a distance approximately equal to first distance D1 corresponding to the first distal extent of first outer peripheral wall section 306. In such cases, it will be appreciated that second outer peripheral wall section 308 will extend beyond mounting wall portion 310 and along at least a portion of flexible spring member 206. As such, end member body 284 can, in some cases, include an inner support wall portion 318 extending in an approximately axial direction from along mounting wall portion 310 toward end wall portion 316. In such cases, inner support wall portion 318 can extend peripherally about axis AX along and in inwardly-spaced relation to second outer peripheral wall section 308. In such cases, inner support wall portion 318 can extend peripherally along at least part of second outer peripheral wall section 308 in the area between arrows WS2.

End member body 284 can further include an inner wall portion 320 extending peripherally about axis AX and extending from along base wall portion 294 toward mounting wall portion 310. Inner wall portion 320 separates the end member volume (not numbered) of end member 202 into an end member reservoir 322 disposed outwardly of the inner wall portion and an end member chamber 324 disposed inwardly of the inner wall portion. Inner wall portion 320 includes an outer surface 326 and an inner surface 328. Outer surface 326, inside surface 296 and inner surface 302 together at least partially define end member reservoir 322. Inner surface 328 and inside surface 296 at least partially define end member chamber 324, which, in a preferred arrangement, is substantially contiguous with spring chamber 208.

In some cases, one or more openings, passages and/or conduits can extend through one or more portions of inner wall portion 320 such that end member reservoir 322 and end member chamber 324 can be disposed in fluid communication with one another. It will be appreciated that openings, passages and/or conduits of any suitable size, shape and/or quantity can be used. As one example, openings 330 can extend through inner wall portion 320 through which end member reservoir 322 and end member chamber 324 can be in fluid communication with one another and with spring chamber 208. In some cases, opening 330 can be of sufficient size to permit end member reservoir 322 and end member chamber 324 to operate as a substantially contiguous or otherwise unified fluid chamber. That is, openings 330 can be sufficiently large that minimal fluid flow restriction (e.g., approximate zero fluid flow restriction) will occur for pressurized gas flowing between end member reservoir 322 and end member chamber 324 under typical conditions of operation. In other cases, openings 330 can at least partially form a passage, orifice or conduit of sufficient size and/or length to provide pressurized gas damping due to gas flow through the openings and thereby dissipate kinetic energy acting on gas spring assembly 200.

Figure 7:
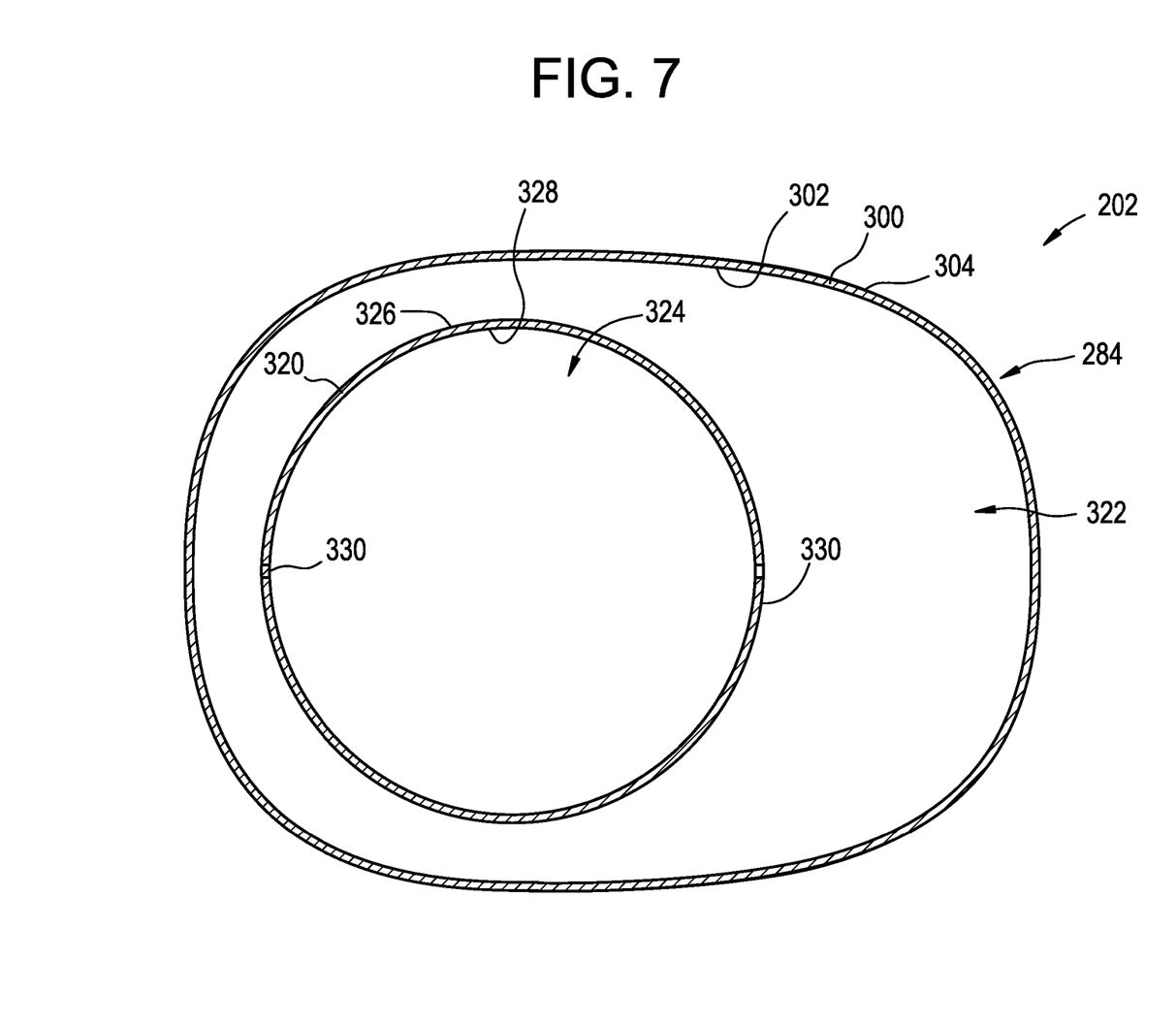
FIG. 7 is a cross-sectional plan view of the gas spring assembly in FIGS. 2-6 taken from along line 7-7 in FIG. 5.

Additionally, inner wall portion 320 extends peripherally about a wall portion axis AXW that is disposed at an included angle relative to longitudinal axis AX of gas spring assembly 200, as is represented in FIG. 5 by reference dimension AG1. In a preferred arrangement, angle AG1 is an acute angle within a range of approximately 3 degrees to approximately 15 degrees. As such, as is shown in FIG. 7, inner wall portion 320 has an approximately circular cross-sectional profile such that the inner wall portion has an overall cylindrical shape disposed at an angle relative to base wall portion 294 and mounting wall portion 310, which are oriented transverse (e.g., at least approximately perpendicular) to longitudinal axis AX. Additionally, inner wall portion 320 is has a cross-sectional dimension across inner surfaces, which is represented by reference dimension D3 in FIG. 5.

It will be recognized and appreciated that flexible wall 220 has a cross-sectional wall thickness THK (FIG. 5) extending between outer and inner surfaces 226 and 228. As flexible wall 220 extends from end 224 along outer side wall portion 254 of end member 204, a cross-sectional dimension is formed across the inner surface of the flexible wall, as is represented in FIG. 5 by reference dimension D4. It will be appreciated that cross-sectional dimension D4 is roughly equal to the cross-sectional dimension across outer surface 236 of end member 204 plus two times the thickness of the flexible wall (e.g., wall thickness THK). In a preferred arrangement, cross-sectional dimension D3 across inner surface 328 of inner wall portion 320 can be greater than cross-sectional dimension D4 such that at least a portion of end member 204 together with a portion of flexible wall 220 extending therealong can be at least partially received within end member chamber 324. As one example, cross-sectional dimension D3 can be within a range of from approximately 105 percent to approximately 160 percent of cross-sectional dimension D4 and, more preferably, within a range of from approximately 110 percent to approximately 140 percent of cross-sectional dimension D4.

Gas spring assembly 200 is shown in FIGS. 2, 3 and 5 disposed at a nominal or design height at approximately which the gas spring assembly maintain during conventional use. Under increased load conditions or upon incurring dynamic inputs generating a sudden and temporary increase in the load on the gas spring assembly, end members 202 and 204 are displaced toward one another toward a compressed or jounce condition. In some applications, one or both of the end members will travel through a curvilinear, rotational, arcuate, angular or other non-linear motion. One example of such motion is shown in FIG. 6. End member 204 is shown in FIG. 6 as including an end member axis AXM. As end member 204 is displaced toward a jounce condition, pivot point PVT of lower structural component LSC results in movement of end member 204 through a curve or arc, which results in end member 204 and axis AXM thereof being disposed at an included angle relative to longitudinal axis AX, as is represented in FIG. 6 by reference dimension AG2. In a preferred arrangement, angle AG1 of inner wall portion 320 is approximately equal to angle AG2 experienced by end member 204 under a full jounce condition. As such, it will be appreciated that any suitable angle or range of angles can be used for angles AG1 and AG2, such as may vary from application-to-application.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring assembly comprising:
a flexible spring member having a longitudinal axis and including a flexible wall extending longitudinally between first and second ends and peripherally about said axis to at least partially define a spring chamber;
a first end member secured across said first end of said flexible spring member such that a substantially fluid-tight seal is formed therebetween; and,
a second end member disposed in spaced relation to said first end member and secured across said second end of said flexible spring member such that a substantially fluid-tight seal is formed therebetween, said second end member including an end member wall that includes:
a base wall portion disposed transverse to said longitudinal axis;
an outer wall portion extending axially from along said base wall portion in a first direction toward said first end member, said outer wall portion extending peripherally about said longitudinal axis and at least partially defining an outermost periphery of said second end member;
a mounting wall portion disposed in axially spaced relation to said base wall portion in said first direction, said mounting wall portion extending peripherally around said longitudinal axis and spaced inward from said outer wall portion, said mounting wall portion dimensioned to receivingly engage said second end of said flexible spring member;
an end wall portion extending peripherally about said longitudinal axis and operatively connecting said outer wall portion and said mounting wall portion to at least partially define an end member volume within said second end member; and,
an inner wall portion having a wall portion axis disposed at a first acute angle relative to said longitudinal axis, said inner wall portion extending peripherally about said longitudinal axis and extending from along said base wall portion in said first direction toward said mounting wall portion, said inner wall portion separating said end member volume into an end member reservoir disposed outwardly of said inner wall portion and an end member chamber substantially contiguous with said spring chamber;
said gas spring assembly displaceable during use between an extended condition and a compressed condition, said inner wall portion dimensioned such that at least a portion of said first end member can be coextensively received within said end member chamber in said compressed condition.

2. A gas spring assembly according to claim 1, wherein said outer wall portion has a first peripheral wall section with a first distal extent offset a first distance from said base wall portion and a second peripheral wall section with a second distal extent offset a second distance from said base wall portion with said second distance being greater than said first distance.

3. A gas spring assembly according to claim 2, wherein said end wall portion extends between said mounting wall portion and said first and second peripheral wall sections of said outer wall portion such that said end wall portion has a non-planar peripheral profile about said longitudinal axis.

4. A gas spring assembly according to claim 2, wherein said mounting wall portion is offset from said base wall portion a distance less than said second distance of said second peripheral wall section such that at least part of said end wall portion is disposed beyond said second end of said flexible spring member in said first direction.

5. A gas spring assembly according to claim 2, wherein said end member wall includes an inner support wall portion disposed inwardly from said outer wall portion, said inner support wall portion extending between said mounting wall portion and said end wall portion and extending peripherally about said longitudinal axis along at least a portion of said second peripheral wall section.

6. A gas spring assembly according to claim 1, wherein said first end member includes an end member axis and during displacement of said gas spring assembly between said extended and said compressed conditions said end member is displaceable between a first orientation in which said end member axis is at least approximately aligned with said longitudinal axis and a second orientation in which said second end member axis is disposed at a second acute angle relative to said longitudinal axis.

7. A gas spring assembly according to claim 6, wherein said first and second acute angles are within a range of from approximately 3 degrees to approximately 15 degrees.

8. A gas spring assembly according to claim 1, wherein said inner wall portion extends between and operatively connects said base wall portion and said mounting wall portion.

9. A gas spring assembly according to claim 1, wherein said first end member includes an outer side wall with an outside surface along which said flexible wall of said flexible spring member can form a rolling lobe that is displaceable along said outside surface of said first end member as said gas spring assemble is displaced between extended and compressed conditions.

10. A gas spring assembly according to claim 9, wherein said flexible wall of said flexible spring member has an outer surface disposed in abutting engagement with said outside surface of said outer side wall of said first end member and an inner surface that at least partially defines said spring chamber, said inner surface having a cross-sectional dimension transverse to said longitudinal axis along a portion of said flexible wall disposed along said first end member.

11. A gas spring assembly according to 10, wherein said inner wall portion has a cross-sectional dimension transverse to said wall portion axis that is greater than said cross-sectional dimension of said inner surface such that at least a portion of said first end member and at least a portion of said flexible spring member disposed along said first end member can be received within said end member chamber of said second end member.

12. A gas spring assembly according to claim 11, wherein said cross-sectional dimension of said inner wall portion is within a range of from approximately 110 percent to approximately 140 percent of said cross-sectional dimension across said inner surface of said flexible wall.

13. A gas spring assembly according to claim 1, wherein said mounting wall portion is offset from said base wall portion a distance approximately equal to said first distance of said first distal extent.

14. A gas spring end member having an end member axis and being dimensioned for securement to an associated flexible spring member, said gas spring end member comprising:
an end member wall at least partially formed from one of a metal material and a polymeric material, said end member wall including:
a base wall portion disposed transverse to said end member axis;
an outer wall portion extending axially from along said base wall portion in a first direction, said outer wall portion extending peripherally about said end member axis and at least partially defining an outermost periphery of said gas spring end member;
a mounting wall portion disposed in axially spaced relation to said base wall portion in said first direction, said mounting wall portion extending peripherally around said end member axis and spaced inward from said outer wall portion, said mounting wall portion dimensioned to receivingly engage an associated end of the associated flexible spring member;
an end wall portion extending peripherally about said end member axis and operatively connecting said outer wall portion and said mounting wall portion to at least partially define an end member volume within said gas spring end member; and,
an inner wall portion having a wall portion axis disposed at a first acute angle relative to said end member axis, said inner wall portion extending peripherally about said end member axis and extending from along said base wall portion in said first direction toward said mounting wall portion, said inner wall portion separating said end member volume into an end member reservoir disposed outward of said inner wall portion and an end member chamber disposed inward of said inner wall portion.

15. A gas spring end member according to claim 14, wherein said outer wall portion has a first peripheral wall section with a first distal extent offset a first distance from said base wall portion and second peripheral wall section with a second distal extent offset a second distance from said base wall portion with said second distance being greater than said first distance.

16. A gas spring end member according to claim 15, wherein said end wall portion extends between said mounting wall portion and said first and second peripheral wall sections of said outer wall portion such that said end wall portion has a non-planar peripheral profile about said end member axis.

17. A gas spring end member according to 16, wherein said mounting wall portion is offset from said base wall portion a distance less than said second distance of said second peripheral wall section such that at least part of said end wall portion is disposed beyond said mounting wall portion in said first direction.

18. A gas spring end member according to claim 15, wherein said end member wall includes an inner support wall portion disposed inwardly from said outer wall portion, said inner support wall portion extending between said mounting wall portion and said end wall portion and extending peripherally about said end member axis along at least a portion of said second peripheral wall section.

19. A gas spring end member according to claim 14, wherein said first acute angle is within a range of approximately 3 degrees to approximately 15 degrees.

20. A gas spring end member according to claim 14, wherein said inner wall portion extends between and operatively connects said base wall portion and said mounting wall portion.

* * * * *